United States Patent
Sun et al.

(10) Patent No.: US 11,268,012 B2
(45) Date of Patent: Mar. 8, 2022

(54) WATER-BASED VISCOSITY REDUCER FOR EMULSIFYING ULTRA-HEAVY OIL AND PREPARATION METHOD THEREOF

(71) Applicants: SHANDONG UNIVERSITY, Jinan (CN); SHOUGUANG XINHAI ENERGY TECHNOLOGY CO., LTD., Weifang (CN)

(72) Inventors: Dejun Sun, Jinan (CN); Yachao Zhu, Jinan (CN); Maoxin Wang, Jinan (CN); Pengcheng Wei, Jinan (CN); Jianhua Zhou, Weifang (CN)

(73) Assignees: SHANDONG UNIVERSITY, Jinan (CN); SHOUGUANG XINHAI ENERGY TECHNOLOGY CO., LTD., Weifang (CN)

( * ) Notice: Subject to any disclaimer, the term of this patent is extended or adjusted under 35 U.S.C. 154(b) by 201 days.

(21) Appl. No.: 16/622,356

(22) PCT Filed: May 2, 2018

(86) PCT No.: PCT/CN2018/085285
§ 371 (c)(1),
(2) Date: Dec. 13, 2019

(87) PCT Pub. No.: WO2019/011045
PCT Pub. Date: Jan. 17, 2019

(65) Prior Publication Data
US 2020/0199441 A1 Jun. 25, 2020

(30) Foreign Application Priority Data
Jul. 10, 2017 (CN) .......................... 201710558109.0

(51) Int. Cl.
*C09K 8/584* (2006.01)

(52) U.S. Cl.
CPC .................................. *C09K 8/584* (2013.01)

(58) Field of Classification Search
None
See application file for complete search history.

(56) References Cited

U.S. PATENT DOCUMENTS

| 4,330,450 A | * | 5/1982 | Lipowski | C02F 1/54 |
| | | | | 162/168.1 |
| 4,505,828 A | * | 3/1985 | Lipowski | C02F 1/54 |
| | | | | 166/275 |

(Continued)

FOREIGN PATENT DOCUMENTS

| CN | 101619209 A | 1/2010 |
| CN | 105670592 A | 6/2016 |

(Continued)

*Primary Examiner* — John J Figueroa
(74) *Attorney, Agent, or Firm* — Troutman Pepper Hamilton Sanders LLP; Christopher C. Close, Jr.

(57) ABSTRACT

A water-based viscosity reducer for emulsifying ultra-heavy oil and a preparation method thereof is provided, where the viscosity reducer includes the following components (based on 100 parts by weight): 0.7 to 4 parts of surfactant, 0 to 10 parts of oil phase, and the balance being a water phase; and the preparation method thereof is stirring the surfactant, the oil phase, and the water phase at room temperature for mixing evenly, to form the water-based viscosity reducer for emulsifying ultra-heavy oil. The invention greatly improves the overall surface activity by using the synergistic effect generated by the compounding of surfactants, and can significantly reduce oil-water interfacial tension. It is especially suitable for emulsifying viscosity reduction of alkali-sensitive stratum, has characteristics such as low cost, safety, and simple preparation, and can effectively enhance heavy oil recovery.

12 Claims, 2 Drawing Sheets

(56) References Cited

U.S. PATENT DOCUMENTS

| | | | | |
|---|---|---|---|---|
| 5,670,460 A | * | 9/1997 | Neely | C09K 8/035 |
| | | | | 507/203 |
| 2014/0238679 A1 | * | 8/2014 | Pope | C10L 1/328 |
| | | | | 166/300 |

FOREIGN PATENT DOCUMENTS

| | | |
|---|---|---|
| CN | 106520102 A | 3/2017 |
| CN | 107474814 A | 12/2017 |
| CN | 105542149 A | 6/2018 |

* cited by examiner

WATER-BASED VISCOSITY REDUCER FOR EMULSIFYING ULTRA-HEAVY OIL AND PREPARATION METHOD THEREOF

TECHNICAL FIELD

The present invention relates to a water-based viscosity reducer for reducing viscosity of ultra-heavy crude oil for enhancing oil recovery and a preparation method of the viscosity reducer, and belongs to the field of oil exploitation technologies.

BACKGROUND

Heavy crude oil can be divided into ordinary heavy oil, extra-heavy oil, and ultra-heavy oil according to its viscosity and relative density, where the viscosity of ultra-heavy oil is greater than 50,000 mPa·s, and its relative density is larger than 0.98 g/cm$^3$ (130 API). According to existing researches, usually, only crude oil whose viscosity is less than 400 mPa·s can be exploited and transported.

Currently, the viscosity reduction methods commonly used in heavy oil extraction at home and abroad include diluting method with light oil, heating method, upgrading method and the method of using chemical agent. There are unfavorable factors such as shortage of light oil and high price in diluting method with light oil; a large amount of heat energy needs to be consumed in heating method, and there is a relatively high energy and economic loss; an application range of upgrading viscosity reduction is relatively narrow; chemical viscosity reduction includes an oil solubility viscosity reduction technology and a water solubility viscosity reduction technology. The mechanism of the oil solubility viscosity reduction technology is not clear, and it has strong selectivity, what's more, it is difficult to invent a viscosity reducer with an wide application range, and only stability of layered overlapping stacked structures of wax crystal and gelatinous asphaltene is weakened, and the aggregates are not completely "broken up", therefore the capability of its viscosity reduction is limited. However, an application range of the water solubility viscosity reduction technology is relatively wide (including oil reservoir exploitation, wellbore viscosity reduction, pipeline transportation and other fields), as the same time, it has a simple process and low cost, and is easy to implement.

There are many application examples of heavy oil viscosity reduction technologies at home and abroad at present. For example, in a method for viscosity reduction by mixing light crude oil that is disclosed in the China patent document CN103032056B, although the viscosity of the heavy crude oil from a well TH12329 in the Tahe oilfield before the viscosity reduction is 1,800,000 mPa·s at 50° C., and the viscosity of heavy oil at a wellhead after viscosity reduction is lower than 800 mPa·s at 50° C., but a light oil mixing ratio is 0.73:1. In view of the difference in price between heavy oil and light oil, there is an economic loss in viscosity reduction conducted by mixing light oil.

In a method for viscosity reduction by using microorganism that is disclosed in CN 101845298 B, its disadvantages are that it is relatively difficult to treat resins and asphaltenes with complex structures and the microorganism is easily deactivated in a high-temperature and high-salt stratum environment.

A US patent document U.S. Pat. No. 9,453,157 has reported a method of using glycerin phospholipid, vegetable oil, diluents (kerosene, diesel, aromatic solvents, light crude oil, naphtha, and gasoline) and an auxiliary agent (alcohol) as the heavy oil viscosity reducer, and the disadvantage is that the consumption of light crude oil is high and up to 40 wt %.

US 20010042911 has reported a heavy oil viscosity reducer, the viscosity of ordinary heavy crude oil can be reduced to approximately 200 mPa·s when the concentration of the main agent is 0.5 wt %, but the heavy oil viscosity reducer is not suitable for ultra-heavy oil with high-content asphaltenes and resins.

SUMMARY

In view of shortcomings of existing viscosity reducers, the present invention provides a low-cost and safety water-based viscosity reducer for emulsifying ultra-heavy oil with a good viscosity reduction effect, and also provides a preparation method of the viscosity reducer with a simple process.

The water-based viscosity reducer for emulsifying ultra-heavy oil that is provided in the present invention includes the following components (based on 100 parts by weight): 0.7 to 4 parts of surfactant, 0 to 10 parts of oil phase, and the balance being water phase.

The surfactant includes a super-amphiphilic molecular emulsifier and sodium fatty alcohol-polyoxyethylene ether sulfate, and a mass ratio thereof is 1:4 to 4:1, and is preferably 1:1. The super-amphiphilic molecular emulsifier is a superamphiphile in "RESPONSIVE SUPER AMPHIPHILIC MOLECULAR EMULSIFIER, EMULSION, AND PREPARATIONS METHOD THEREOF" disclosed in the Chinese patent document CN 105542149 A.

The oil phase is methylbenzene, xylene, mixed benzene, diesel oil, paraffin oil, or gas-to-liquid (GTL) oil.

The water phase may be water, or a NaCl solution with the concentration not greater than 30 g/L, or a CaCl$_2$ solution with the concentration not greater than 2 g/L, or a mixed solution of NaCl and CaCl$_2$, where the concentration of NaCl in the mixed solution is not greater than 30 g/L and the concentration of CaCl$_2$ is not greater than 2 g/L.

A preparation method of the foregoing water-based viscosity reducer includes:

based on 100 parts by weight, weighing 0.7 to 4 parts of surfactant, 0 to 10 parts of oil phase, and the balance being water phase, and stirring the components at room temperature for mixing evenly, to form the water-based viscosity reducer for emulsifying ultra-heavy oil, where stirring rotation speed is 200 r/min to 500 r/min, and stirring time is 15 min to 30 min.

The water-based viscosity reducer for emulsifying ultra-heavy oil prepared in the present invention greatly improves the overall surface activity by using the synergistic effect generated by the compounding of surfactants, and can significantly reduce oil-water interfacial tension. Therefore, the surfactant is adsorbed around oil droplets through stirring at a certain temperature to form a mixed interfacial film, so as to prevent the oil droplets from aggregating again, and greatly weaken the intramolecular friction, thereby forming O/W emulsion, so that the viscosity of ultra-heavy oil is reduced by up to 99.99%. In addition, this water-based viscosity reducer does not contain alkali, and is especially suitable for emulsifying viscosity reduction of the alkali-sensitive stratum. The water-based viscosity reducer in the present invention has characteristics such as low cost, safety, and simple preparation, and can effectively enhance ultra-heavy oil recovery.

DETAILED DESCRIPTION

Embodiment 1

Figure 1:
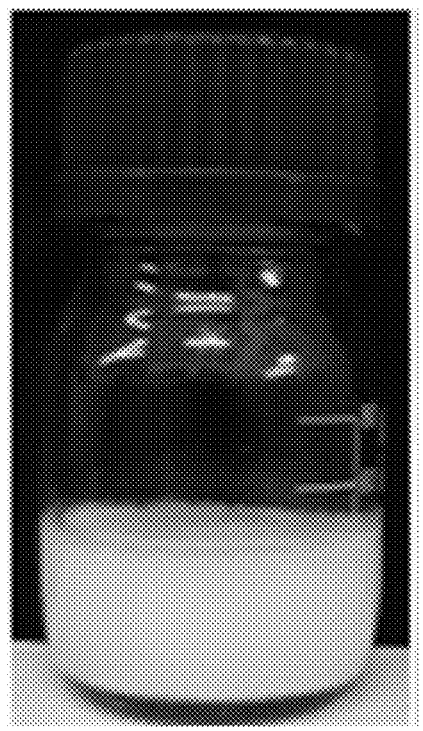
FIG. 1 is a schematic diagram of a sample of the water-based viscosity reducer prepared in the present invention.
Figure 2:
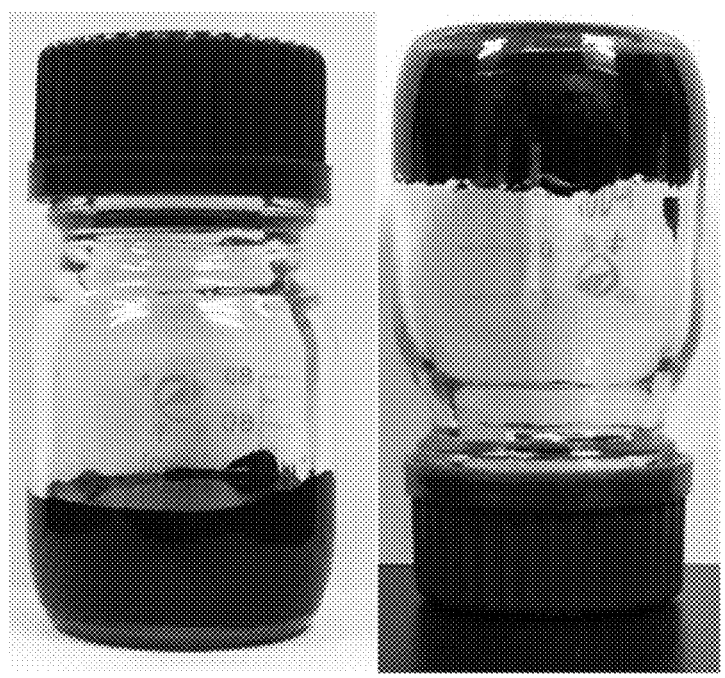
FIG. 2 is a schematic diagram of a sample of heavy oil at 50° C.
Figure 3:
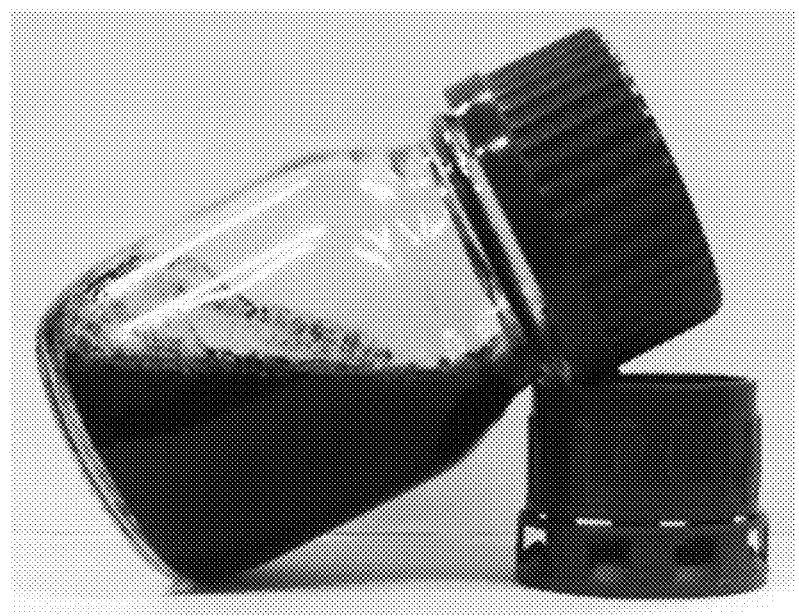
FIG. 3 is a schematic diagram of emulsifying viscosity reduction effect of ultra-heavy oil in the present invention.

Based on 100 parts by weight, the following components are respectively weighted: 2 parts of a super-amphiphilic molecular emulsifier, 2 parts of sodium fatty alcohol-polyoxyethylene ether sulfate, 10 parts of paraffin oil, and 86 parts of deionized water. These components are successively placed in a reactor and mixed evenly, and stirred for 20 min at room temperature with rotation speed of 300 r/min, so as to form a water-based viscosity reducer.

The emulsifying viscosity reduction effect test is as follows:

(1) Ultra-heavy crude oil is kept at constant temperature for 1 hour in a thermostatic water bath of 50° C., free water and bubbles are removed from the ultra-heavy crude oil through stirring, and an initial viscosity $\mu_0$ of the ultra-heavy crude oil is measured at 50° C.

(2) The ultra-heavy crude oil and the water-based viscosity reducer with a fixed mass ratio of 2:1 are added to a beaker; the beaker is placed in a thermostatic water bath of 80° C. and kept at constant temperature for 1 hour; the rotation speed is adjusted to 500 r/min, and stirring is conducted for 20 min in a constant temperature condition, so as to prepare heavy oil emulsion; and the viscosity $\mu$ of the heavy oil emulsion is measured at 50° C.

(3) The viscosity reduction ratio is calculated according to the following formula:

$$\text{viscosity reduction ratio} = \frac{\mu_0 - \mu}{\mu_0} \times 100\%.$$

The result is shown in following table:

| | |
|---|---|
| Heavy crude oil sample viscosity (mPa · s) | 2429091 |
| Heavy oil emulsion viscosity (mPa · s) | 57.6 |
| Viscosity reduction ratio (%) | 99.99 |

Embodiment 2

Based on 100 parts by weight, the following components are respectively weighted: 0.14 parts of a super-amphiphilic molecular emulsifier, 0.56 parts of sodium fatty alcohol-polyoxyethylene ether sulfate, 2 parts of methylbenzene, and 97.3 parts of a NaCl solution (aqueous solution) with the concentration of 20 g/L. These components are successively placed in a reactor and mixed evenly, and stirred for 30 min at room temperature with rotation speed of 200 r/min, so as to form a water-based viscosity reducer.

According to the method in Embodiment 1, the viscosity reduction effect of the water-based viscosity reducer is measured, and data is as follows:

| | |
|---|---|
| Heavy crude oil sample viscosity (mPa · s) | 959530 |
| Heavy oil emulsion viscosity (mPa · s) | 53.9 |
| Viscosity reduction ratio (%) | 99.99 |

Embodiment 3

Based on 100 parts by weight, the following components are respectively weighted: 1.6 parts of a super-amphiphilic molecular emulsifier, 0.4 parts of sodium fatty alcohol-polyoxyethylene ether sulfate, 3 parts of diesel oil, and 95 parts of the mixed solution of NaCl and $CaCl_2$, where in the mixed solution, the content of NaCl is 30 g/L, and the content of $CaCl_2$ is 2 g/L. These components are successively placed in a reactor and mixed evenly, and stirred for 15 min at room temperature with rotation speed of 500 r/min, so as to form a water-based viscosity reducer.

According to the method in Embodiment 1, the viscosity reduction effect of the water-based viscosity reducer is measured, and data is as follows:

| | |
|---|---|
| Heavy crude oil sample viscosity (mPa · s) | 959530 |
| Heavy oil emulsion viscosity (mPa · s) | 82.2 |
| Viscosity reduction ratio (%) | 99.99 |

Embodiment 4

Based on 100 parts by weight, the following components are respectively weighted: 2 parts of a super-amphiphilic molecular emulsifier, 1 part of sodium fatty alcohol-polyoxyethylene ether sulfate, 2 parts of mixed benzene, and 97 parts of the mixed solution of NaCl and $CaCl_2$, where in the mixed solution, the content of NaCl is 15 g/L, and the content of $CaCl_2$ is 1 g/L. These components are successively placed in a reactor and mixed evenly, and stirred for 20 min at room temperature with rotation speed of 400 r/min, so as to form a water-based viscosity reducer.

According to the method in Embodiment 1, the viscosity reduction effect of the water-based viscosity reducer is measured, and data is as follows:

| | |
|---|---|
| Heavy crude oil sample viscosity (mPa · s) | 959530 |
| Heavy oil emulsion viscosity (mPa · s) | 74 |
| Viscosity reduction ratio (%) | 99.99 |

Embodiment 5

Based on 100 parts by weight, the following components are respectively weighted: 1 part of a super-amphiphilic molecular emulsifier, 2 parts of sodium fatty alcohol-polyoxyethylene ether sulfate, 7 parts of gas oil, and 90 parts of a $CaCl_2$ solution with a concentration of 0.5 g/L. These components are successively placed in a reactor and mixed evenly, and stirred for 20 min at room temperature with rotation speed of 300 r/min, so as to form a water-based viscosity reducer.

According to the method in Embodiment 1, the viscosity reduction effect of the water-based viscosity reducer is measured, and data is as follows:

| | |
|---|---|
| Heavy crude oil sample viscosity (mPa · s) | 2429091 |
| Heavy oil emulsion viscosity (mPa · s) | 107.4 |
| Viscosity reduction ratio (%) | 99.99 |

Embodiment 6

Based on 100 parts by weight, the following components are respectively weighted: 1.5 parts of super-amphiphilic molecular emulsifier, 1.5 parts of sodium fatty alcohol-polyoxyethylene ether sulfate, 5 parts of xylene, and 93 parts of well water. These components are successively placed in a reactor and mixed evenly, and stirred for 20 min at room temperature with rotation speed of 400 r/min, so as to form a water-based viscosity reducer.

According to the method in Embodiment 1, the viscosity reduction effect of the water-based viscosity reducer is measured, and data is as follows:

| | |
|---|---|
| Heavy crude oil sample viscosity (mPa · s) | 2429091 |
| Heavy oil emulsion viscosity (mPa · s) | 83.4 |
| Viscosity reduction ratio (%) | 99.99 |

Embodiment 7

Based on 100 parts by weight, the following components are respectively weighted: 0.5 parts of super-amphiphilic molecular emulsifier, 0.5 parts of sodium fatty alcohol-polyoxyethylene ether sulfate, and 99 parts of tap water, where no oil phase is added. These components are successively placed in a reactor and mixed evenly, and stirred for 20 min at room temperature with rotation speed of 300 r/min, so as to form a water-based viscosity reducer.

The emulsifying viscosity reduction effect test is as follows:

(1) Ultra-heavy oil is kept at constant temperature for 1 hour in a thermostatic water bath of 50° C., free water and bubbles are removed from the ultra-heavy oil through stirring, and an initial viscosity $\mu_0$ of the ultra-heavy crude oil is measured at 50° C.

(2) The ultra-heavy crude oil and the water-based viscosity reducer with a fixed mass ratio of 7:3 are added to a beaker; the beaker is placed in a thermostatic water bath of 50° C. and kept at constant temperature for 1 hour; the rotation speed is adjusted to 500 r/min, and stirring is conducted for 20 min in a constant temperature condition, so as to prepare heavy oil emulsion; and a viscosity $\mu$ of the heavy oil emulsion is measured at 50° C.

(3) The viscosity reduction ratio is calculated according to the following formula:

$$\text{viscosity reduction ratio} = \frac{\mu_0 - \mu}{\mu_0} \times 100\%.$$

The result is shown in the following table:

| | |
|---|---|
| Heavy crude oil sample viscosity (mPa · s) | 343845 |
| Heavy oil emulsion viscosity (mPa · s) | 15.4 |
| Viscosity reduction ratio (%) | 99.99 |

Embodiment 8

Based on 100 parts by weight, the following components are respectively weighted: 0.5 parts of a super-amphiphilic molecular emulsifier, 0.5 parts of sodium fatty alcohol-polyoxyethylene ether sulfate, and 93 parts of a NaCl solution with the concentration of 5 g/L, where no oil phase is added. These components are successively placed in a reactor and mixed evenly, and stirred for 20 min at room temperature with rotation speed of 400 r/min, so as to form a water-based viscosity reducer.

According to the method in Embodiment 7, the viscosity reduction effect of the water-based viscosity reducer is measured, and data is as follows:

| | |
|---|---|
| Heavy crude oil sample viscosity (mPa · s) | 376554 |
| Heavy oil emulsion viscosity (mPa · s) | 17.5 |
| Viscosity reduction ratio (%) | 99.99 |

What is claimed is:

1. A water-based viscosity reducer for emulsifying ultra-heavy oil, comprising the following components (based on 100 parts by weight): 0.7 to 4 parts of a surfactant, 0 to 10 parts of an oil phase, and the balance being a water phase, wherein the surfactant comprises a super-amphiphilic molecular emulsifier and sodium fatty alcohol-polyoxyethylene ether sulfate, and the mass ratio thereof is 1:4 to 4:1.

2. The water-based viscosity reducer for emulsifying ultra-heavy oil according to claim 1, wherein the surfactant comprises a super-amphiphilic molecular emulsifier and sodium fatty alcohol-polyoxyethylene ether sulfate, and the mass ratio thereof is 1:1.

3. The water-based viscosity reducer for emulsifying ultra-heavy oil according to claim 1, wherein the oil phase is methylbenzene, xylene, mixed benzene, diesel oil, paraffin oil, or gas oil.

4. The water-based viscosity reducer for emulsifying ultra-heavy oil according to claim 1, wherein the water phase is water, or NaCl solution with the concentration not greater than 30 g/L, or $CaCl_2$) solution with the concentration not greater than 2 g/L, or a mixed solution of NaCl and $CaCl_2$), where the concentration of NaCl in the mixed solution is not greater than 30 g/L and the concentration of $CaCl_2$) is not greater than 2 g/L.

5. A preparation method of the water-based viscosity reducer for emulsifying ultra-heavy oil according to claim 1, wherein based on 100 parts by weight, weighing 0.7 to 4 parts of surfactant, 0 to 10 parts of oil phase, and the balance being water phase, and stirring the components at room temperature for mixing evenly, to form the water-based viscosity reducer for emulsifying ultra-heavy oil, wherein a stirring rotation speed is 200 r/min to 500 r/min, and a stirring time is 15 min to 30 min.

6. A preparation method of the water-based viscosity reducer for emulsifying ultra-heavy oil according to claim 2, wherein based on 100 parts by weight, weighing 0.7 to 4 parts of surfactant, 0 to 10 parts of oil phase, and the balance being water phase, and stirring the components at room temperature for mixing evenly, to form the water-based viscosity reducer for emulsifying ultra-heavy oil.

7. The water-based viscosity reducer for emulsifying ultra-heavy oil according to claim 6, wherein a stirring rotation speed is 200 r/min to 500 r/min, and a stirring time is 15 min to 30 min.

8. A preparation method of the water-based viscosity reducer for emulsifying ultra-heavy oil according to claim 3, wherein based on 100 parts by weight, weighing 0.7 to 4 parts of surfactant, 0 to 10 parts of oil phase, and the balance being water phase, and stirring the components at room temperature for mixing evenly, to form the water-based viscosity reducer for emulsifying ultra-heavy oil.

9. The water-based viscosity reducer for emulsifying ultra-heavy oil according to claim 8, wherein a stirring rotation speed is 200 r/min to 500 r/min, and a stirring time is 15 min to 30 min.

10. A preparation method of the water-based viscosity reducer for emulsifying ultra-heavy oil according to claim 4, wherein based on 100 parts by weight, weighing 0.7 to 4 parts of surfactant, 0 to 10 parts of oil phase, and the balance being water phase, and stirring the components at room temperature for mixing evenly, to form the water-based viscosity reducer for emulsifying ultra-heavy oil.

11. The water-based viscosity reducer for emulsifying ultra-heavy oil according to claim 10, wherein a stirring rotation speed is 200 r/min to 500 r/min, and a stirring time is 15 min to 30 min.

12. A water-based viscosity reducer for emulsifying ultra-heavy oil, comprising the following components (based on 100 parts by weight): 0.7 to 4 parts of a surfactant, 0 to 10 parts of an oil phase, and the balance being a water phase, wherein the surfactant comprises a super-amphiphilic molecular emulsifier and sodium fatty alcohol-polyoxyethylene ether sulfate, and the mass ratio thereof is 1:1.

* * * * *